(12) United States Patent
Matsuda et al.

(10) Patent No.: US 6,230,083 B1
(45) Date of Patent: May 8, 2001

(54) ROAD SHAPE PREDICTING METHOD AND VEHICLE CONTROLLING METHOD

(75) Inventors: Shohei Matsuda; Makoto Otabe; Yuji Sakaki, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/351,297

(22) Filed: Jul. 12, 1999

(30) Foreign Application Priority Data

Jul. 10, 1998 (JP) .................................................. 10-196258

(51) Int. Cl.⁷ ............................. G08G 1/09; G05D 3/00
(52) U.S. Cl. ............................. 701/1; 340/995; 701/210
(58) Field of Search .......................... 701/1, 201, 205, 701/209, 210, 207, 225, 208; 340/995

(56) References Cited

U.S. PATENT DOCUMENTS

| | | | |
|---|---|---|---|
| 5,661,650 | * | 8/1997 | Sekine et al. ................ 364/424.027 |
| 6,023,653 | * | 2/2000 | Ichimura et al. ..................... 701/208 |
| 6,058,350 | * | 4/2000 | Ihara ..................................... 701/208 |
| 6,067,497 | * | 4/2000 | Sekine et al. .......................... 701/93 |
| 6,070,121 | * | 4/2000 | Matsuda ............................... 701/205 |

FOREIGN PATENT DOCUMENTS 10-283594    10/1998 (JP) .

* cited by examiner

*Primary Examiner*—Tan Nguyen
*Assistant Examiner*—Dalena Tran
(74) *Attorney, Agent, or Firm*—Arent Fox Kintner Plotkin & Kahn, PLLC

(57) ABSTRACT

A road shape predicting method includes the steps of: selecting three positions of positions of a plurality of nodes constituting road map data and an own vehicle position on a road; and predicting the road shape on the basis of a crossing angle formed by a link connecting a first position and a second position of the selected three positions and another link connecting the second and a third position thereof, and a link length between the second and the third positions. In case that the link length between the second and the third positions is not larger than a reference link length set in accordance with the crossing angle, the third position is excluded, and the position of a node further forward is adopted in place of the third position, to thereby predict the road shape.

6 Claims, 8 Drawing Sheets

ROAD SHAPE PREDICTING METHOD AND VEHICLE CONTROLLING METHOD

BACKGROUND OF THE INVENTION

1. Field of the Invention

The present invention relates to a road shape predicting method for predicting the road shape on the basis of map data which are a collection of a plurality of nodes, and a vehicle controlling method using such a predicting method.

2. Description of the Related Art

Such a road shape predicting method and a vehicle controlling method were proposed in U.S. patent application Ser. No. 09/056,244 by the applicant of this invention. As seen from FIG. 4, they use coordinates of a larger number of nodes $N_N$ ($N_N = N_0$, $N_1$, $N_2$, $N_3$, ...) set at prescribed intervals on a road as road map data. On the basis of a link length $L_N$ which is defined as a distance between adjacent nodes $N_N$ and $N_{N+1}$, and a crossing angle $\theta_N$ formed by a certain link $N_{N-1}$ $N_N$ and another link $N_N$ $N_{N+1}$ located forward, a passing state decision quantity (vehicle cornering amount) $\theta_N/L_N$ at each node is computed. The passable speed at the node $N_N$ computed on the basis of the passing state decision quantity $\theta_N/L_N$ is compared with the passage predicting speed at the node $N_N$ through which an own vehicle passes. If it is decided that the passage is difficult, a warning is given to a driver or automatic speed reduction is made. The above passing state decision quantity $\theta_N/L_N$ corresponds to a change quantity in the azimuth angle of a vehicle for a moving distance thereof. Its large value indicates that the road is curved, whereas its small value indicates that the road is straight.

Where there are three nodes $N_0$, $N_1$, $N_2$, on a straight road as shown in FIG. 9, if the positions of the nodes are deviated from the inherent $N_0$, $N_1$, $N_2$, to $N_0'$, $N_1'$, $N_2'$, owing to an error in the road map data, at the node $N_1$, the passing state quantity $\theta 1/L1$ which should not be essentially produced is produced. In this case, if the link length $L_1$ between $N_1$ and $N_2$ is sufficiently large, the passing state decision quantity $\theta_1/L_1$ is relatively small so that the road shape is decided to be a gentle curve approximately to the straight road. Thus, no hitch occurs. On the other hand, if the link length $L_1$ between $N_1$ and $N_2$ is small, the passing state quantity $\theta_1/L_1$ is fairly large so that the road shape which should be actually straight is decided to be erroneously curve.

SUMMARY OF THE INVENTION

The present invention has been accomplished in view of the above circumstance. An object of the present invention is to prevent the road shape from being falsely predicted owing to an error in road map data.

In order to attain the above object, according to the present invention, there is provided a road shape predicting method wherein three positions of the positions of a plurality of nodes constituting road map data and an own vehicle position on a road are selected, and the road shape is predicted on the basis of a crossing angle formed by a link connecting a first position and a second position of the selected three positions and another link connecting the second and a third position thereof and a link length between the second and the third position. Then, in case that the link length between the second and the third position is not larger than the reference link length set in accordance with the crossing angle, the third position is excluded, and the position of a node further forward is adopted in place of the third position to predict the road shape.

In this configuration, in case that the link length between the second and the third position is not larger than the reference link length set in accordance with the crossing angle of two links, the position of the node further forward is adopted in place of the third position to predict the road shape. Therefore, the link length necessarily exceeds the reference link length so that the predicting error in the road shape can be minimized.

In the above configuration, the link length $L_{ref}$ may be given by $$L_{ref} = A\{2d/\tan(\theta/4)\}$$

where

A: a coefficient satisfying $0 < A < 1$ d: an upper limit of a sag $\theta$: a crossing angle formed by two links.

In this configuration, in order to determine a standard for determining a reference link length, $2d/\tan(\theta/4)$ that is the maximum value of the link length between the second and third positions is multiplied by a coefficient A that is larger than 0 and smaller than 1. Therefore, it is possible to avoid setting the reference link length at an excessively large value with anxiety about an increase in the error in the road shape. This prevents the inconvenience that the third position is excluded excessively.

In the embodiment, the above coefficient A is set in a range from 0.2 to 0.5. Therefore, it can be suitably set in a range satisfying $0 < A < 1$ in accordance with the accuracy of the road map data. The upper limit of the sag d is defined as the upper limit of a distance between a link connecting two adjacent nodes and an actual road. In the embodiment, it is actually 2.5 m–6 m.

Further, in addition to the above configuration, in case that the link length between the position of the node further forward and the second position exceeds a prescribed length, the position of the node further forward is not adopted.

In this configuration, where the position of the node further forward is located forward to exceed a prescribed length from the second position, the position of the node further forward is not adopted. For this reason, it is possible to avoid adopting the node not presenting on the same curve to thereby prevent reduction in the predicting accuracy of the road shape.

Incidentally, in the embodiment, although the above prescribed length is set at the maximum link length $L_{max}$, it may be a prescribed constant.

Further, according to another aspect, there is provided a vehicle controlling method using the above road shape predicting method, and the running state of a vehicle is controlled on the basis of the predicted road shape so that the vehicle can pass a forward road.

In this configuration, an error in a road map data is excluded to predict the road shape precisely and the running state is controlled so that the vehicle can pass the road having the predicted shape. For this reason, the vehicle can be suitably controlled according to the road shape so that the vehicle can surely pass a forward road.

DETAILED DESCRIPTION OF THE PREFERRED EMBODIMENTS

Figure 1:
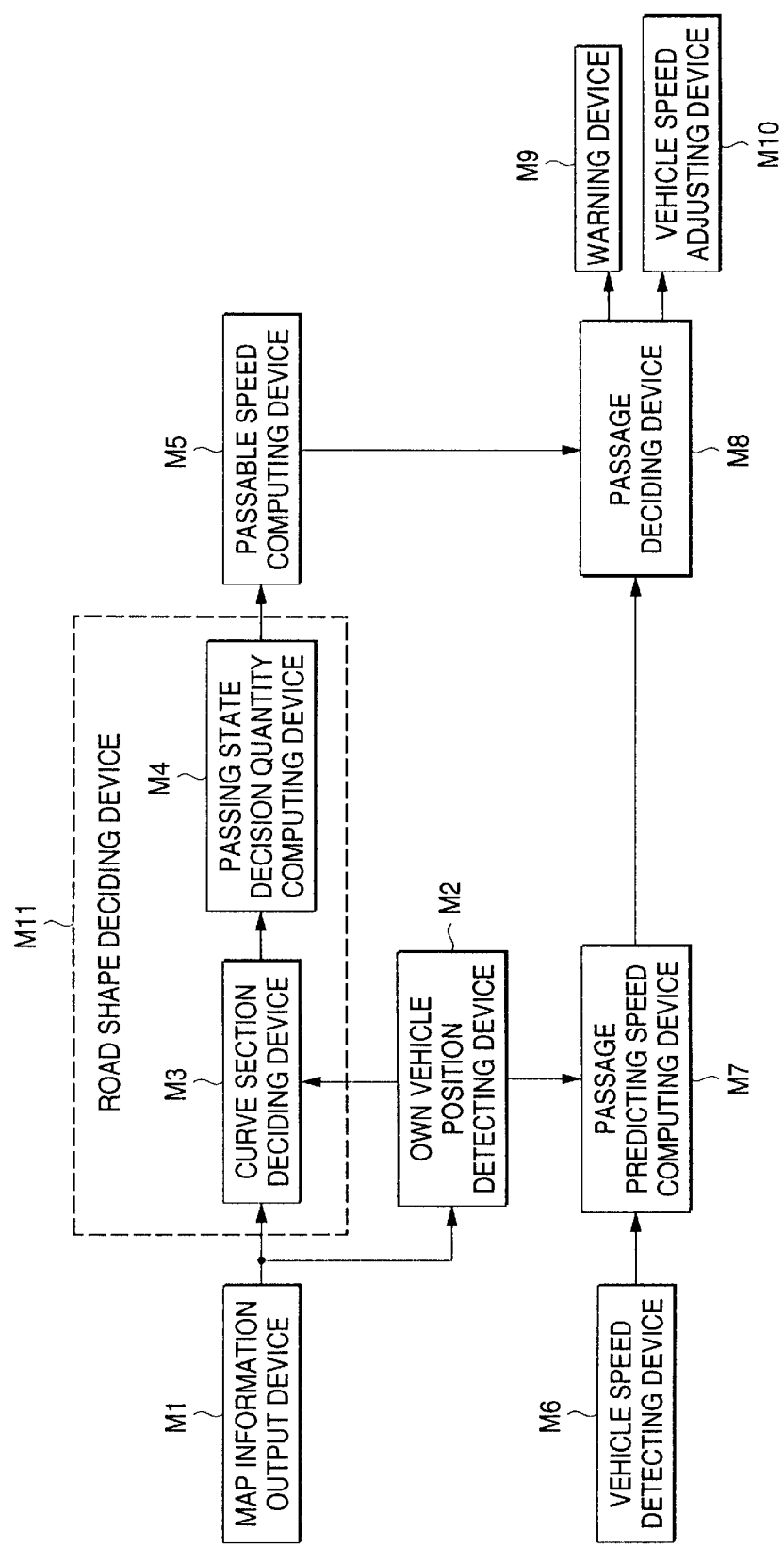
FIG. 1 is a block diagram showing the entire configuration of a passage deciding apparatus of a vehicle.

Referring to the drawings as attached herewith, an explanation will be given of embodiments of the present invention.

As seen from FIG. 1, a passage deciding apparatus mounted on a vehicle includes a map information output device M1, an own vehicle position detecting device M2, a curve section deciding device M3, a passing state decision quantity computing device M4, a passable speed computing device M5, a vehicle speed detecting device M6, a passage predicting speed computing device M7, a passage deciding device M8, a warning device M9 serving as a vehicle controlling device and a vehicle speed adjusting device M10 serving as the vehicle controlling device. The curve section deciding device M3 and passing state decision quantity computing device M4 constitute a road shape deciding device M11.

The map information output device M1 and own vehicle position detecting device M2 are loaded in a known navigation apparatus for a motor vehicle. The map information output device M1 reads out road map data in a prescribed region which are previously stored in an IC card, CD-ROM, storage-rewritable MO (magneto-optic disk), etc. The own vehicle position detecting device M2 superposes the own vehicle position data received from a GPS antenna on the above road map data to detect an own vehicle position P. The road map data are constructed by the coordinates of a large number of nodes $N_N$ set at prescribed intervals.

On the basis of the road map data and own vehicle position P, the curve section deciding device M3 decides whether the node $N_N$ forward of the own vehicle position P is on a curve road or a straight road. The passing state decision quantity computing device M4 computes a passing state decision quantity $\theta_N/L_N$ which is an index for deciding whether or not the vehicle can pass the curve road.

On the basis of the passing state decision quantity $\theta_N/L_N$ and a setting boundary horizontal acceleration G (or setting boundary yaw rate YR) preset to the degree that a driver can pass the curve safely, the passable speed deciding device M5 computes a passable speed $V_{maxN}$ that is a maximum vehicle speed permitting the vehicle to pass the node $N_N$ safely.

The vehicle speed detecting device M6 detects the present vehicle speed V of the own vehicle on the basis of outputs from wheel speed sensors provided at respective wheels. On the basis of the vehicle speed V, own vehicle position P and a predetermined vehicle reference deceleration β, the passage predicting speed computing device M7 computes a passage predicting speed $V_N$ at which the vehicle passes the node $N_N$. The passage deciding device M8 compares the passage predicting speed $V_N$ with the passable speed $V_{maxN}$.

If $V_N \leq V_{maxN}$, M8 decides that the vehicle can pass the node $N_N$. If $V_N > V_{maxN}$, M8 decides that the vehicle is difficult to pass the node $N_N$. In this case, in order that the driver is urged to reduce the vehicle speed, the warning device M9 composed of a buzzer and a lamp is operated, and also in order to reduce the vehicle speed automatically, the vehicle speed adjusting device 10 which may be an automatic braking device, shift-down device of an automatic transmission machine or engine output reducing device, is operated.

Figure 2:
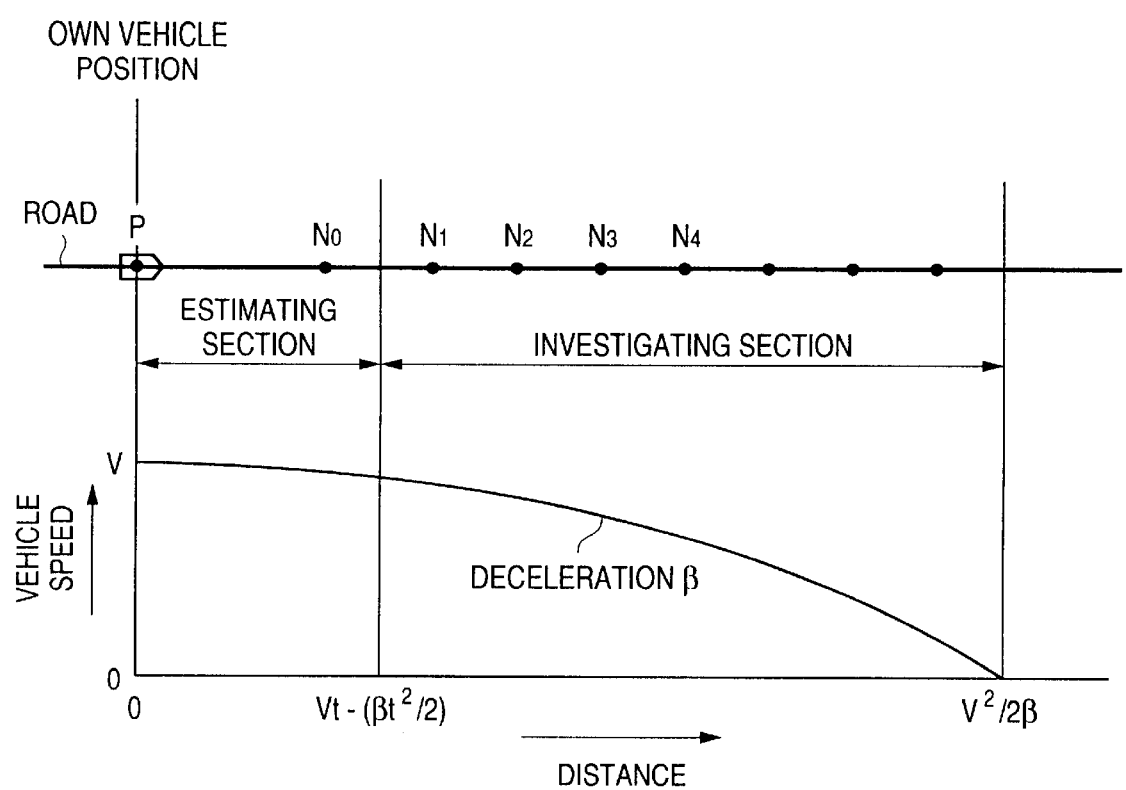
FIG. 2 is a graph for explaining a previous-reading section and an investigating section.

As seen from FIG. 2, the estimating section and investigating section are set on the road forward of the own vehicle position P. The estimating section is set between the own vehicle position P and the node $N_N$ for which a decision is made on whether or not the own vehicle can pass. The estimating section serves to assure a prescribed time t before the own vehicle pass the estimating section to reach the node $N_N$ so that the decision is made on whether or not the own vehicle can pass within the prescribed time t and the warning device M9 and the vehicle speed adjusting device M10 are operated. The investigating section serves to make a decision for the node $N_N$ within the section on whether or not the own vehicle can pass. This avoids making a unnecessary decision for the node $N_N$ very far on whether or not the own vehicle can pass.

Assuming that a driver spontaneously starts braking at the own vehicle position P to pass a forward curve, the reference deceleration β occurring owing to the braking is preset. The estimating section can be determined on the basis of Vt−(βt²/2) representing a distance when the vehicle runs within the prescribed time t. The start of the investigating section is set at the end of the estimating section, and the end thereof is set at the position where the vehicle decelerating at the reference decelerating speed β stops, i.e. at the position far from the own vehicle by a distance $V^2/2\beta$.

Figure 3:
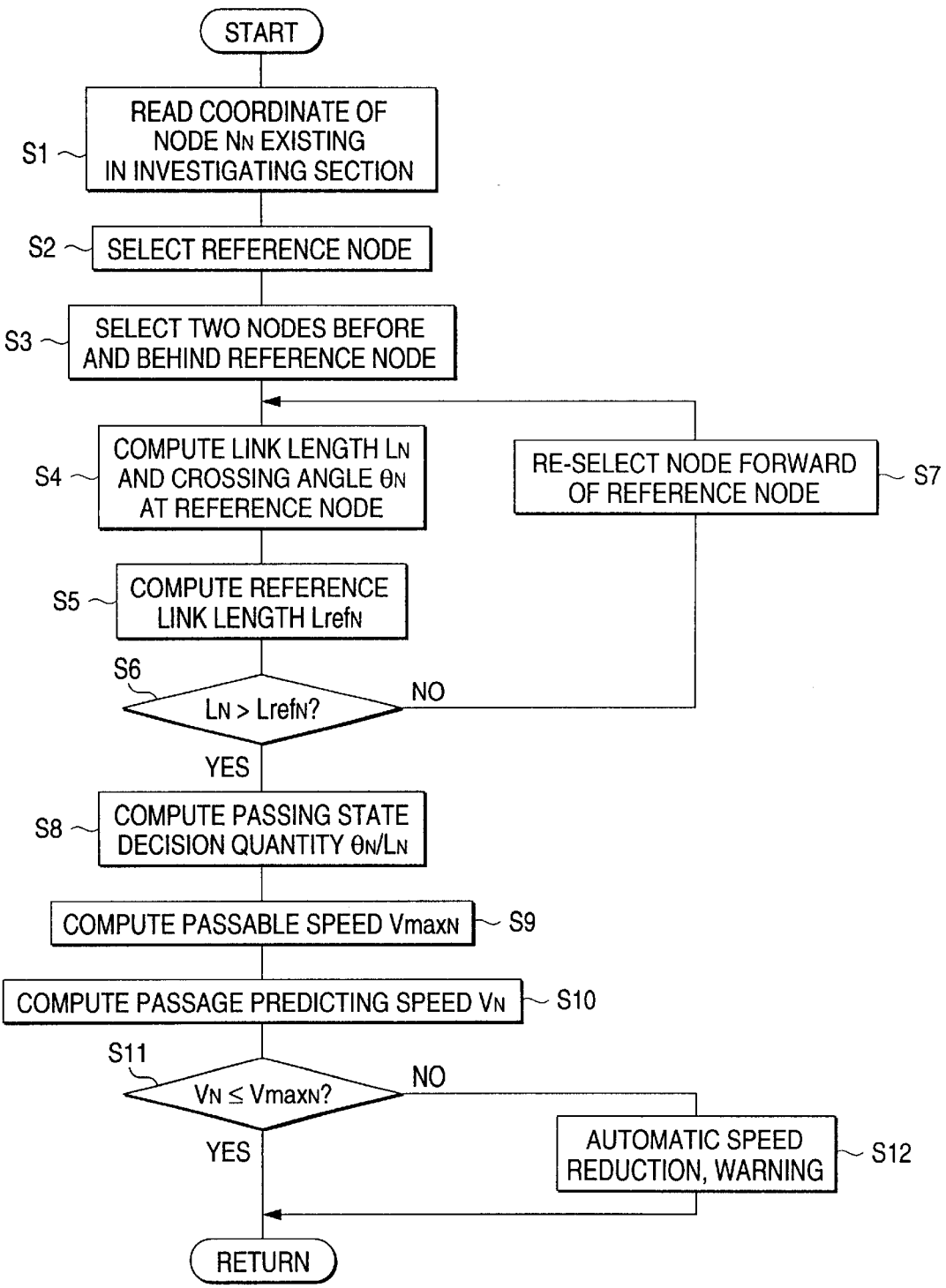
FIG. 3 is a flowchart for explaining an operation of the passage deciding apparatus.

Now referring to the flowchart of FIG. 3, an explanation will be given of the operation of an embodiment of the present invention.

First, in step S1, the coordinates of a plurality of nodes N . . . (N=$N_1$, $N_2$, $N_3$, . . . ) within the investigating section are read. In step S2, any of the plurality of nodes N . . . within the investigating section is selected as a reference node $N_N$. The reference node $N_N$ will be selected sequentially from the first node $N_1$ to the next node $N_2$ for all the nodes N . . . within the investigating section. For each of the reference nodes thus selected, a decision is made on whether or not the own vehicle can pass.

Figure 4:
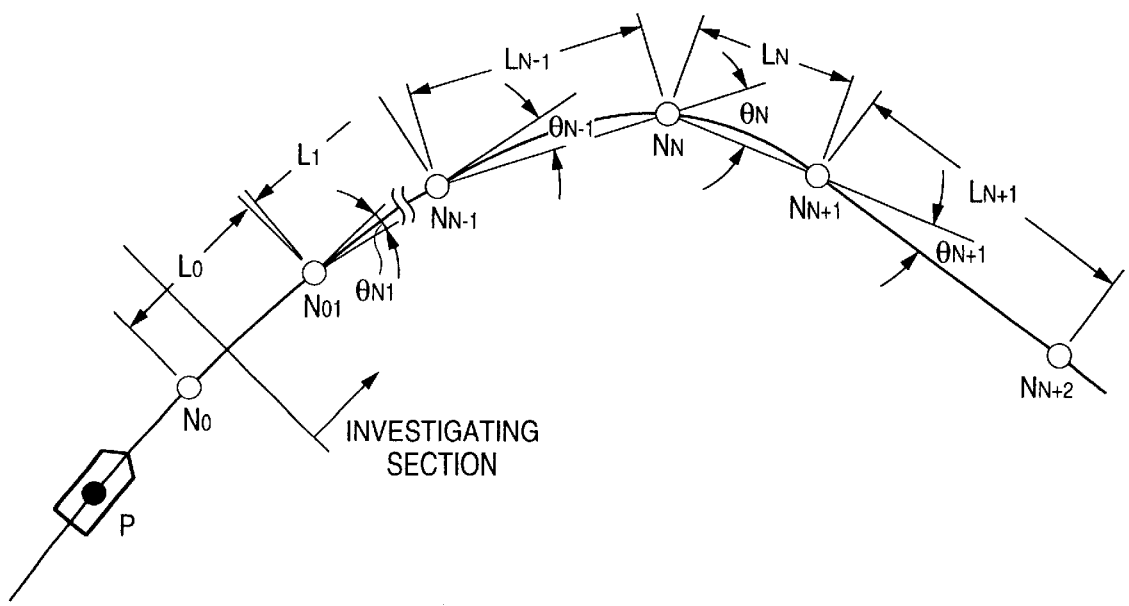
FIG. 4 is a view showing a reference node N, link length L and a crossing angle θ.

As seen from FIG. 4, when the reference node $N_N$ is selected in step S2, in step S3, an node $N_{N-1}$ adjacent backward of the reference node $N_N$ and an node $N_{N+1}$ adjacent forward thereof are selected. In step S4, on the basis of the coordinates of these three nodes $N_{N-1}$, $N_N$ and $N_{N+1}$, the link length $L_N$ and crossing angle $\theta_N$ at the reference node $N_N$ are computed.

Incidentally, when the first node $N_1$ within the investigating section is selected as a reference node, the first node $N_0$ behind the investigating section is selected as a node adjacent backward the reference node $N_1$. In this case, if there is not the above node $N_0$ between the own vehicle position P and the reference node $N_1$, the own vehicle position P is selected in place of the node $N_0$.

In step S5, a reference link length $L_{refN}$ which is a decision standard is computed in order to decide whether or not the node $N_{N+1}$ adjacent forward of the reference node $N_N$ is suitable. An explanation will be given of the computation of the reference link length $L_{refN}$.

Figure 5:
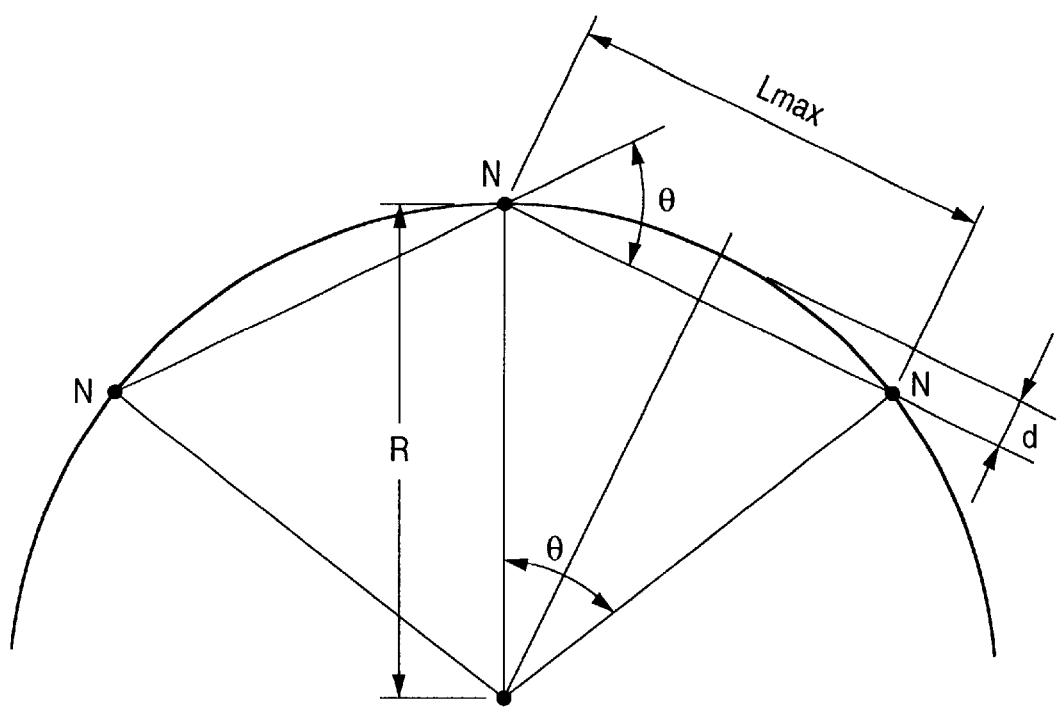
FIG. 5 is a view for explaining a relative equation of the crossing angle θ and a sag d which represents the link length L.
Figure 6A:
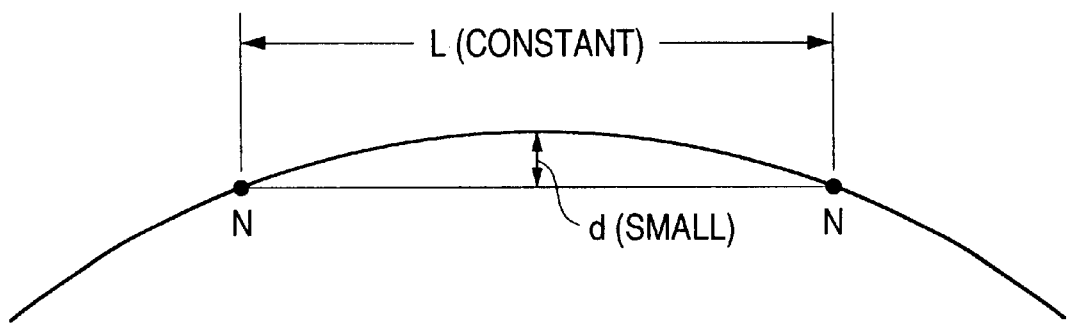
FIGS. 6A and 6B are views for explaining the relationship between the sag d and link length L.
Figure 6B:
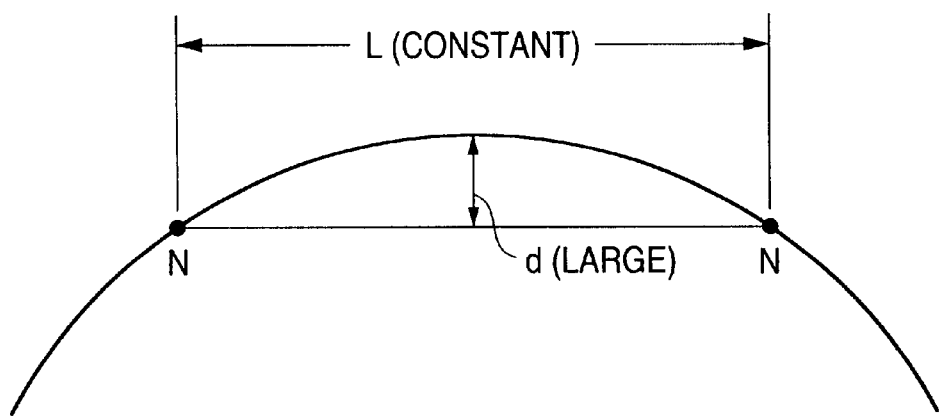

As seen from FIG. 5, it is assumed that when a plurality of nodes N . . . are present on an arc-shaped road, the length of the link connecting two adjacent nodes N and N is L, the distance between the link and the road is a sag d, the curvature of the road is R, and the center angle of the arc between the two nodes N and N is θ. Now the sag will be previously explained. As seen from FIGS. 6A and 6B, it is assumed that an arc-shaped road is represented as a collection of a plurality of nodes N . . . , and the link length L between the adjacent nodes N and N is constant. In this case, as shown in FIG. 6A, when the curvature of the road is large, the maximum value d of the difference between the link connecting the adjacent nodes N and N and the actual road is relatively small. On the other hand, as shown in FIG. 6B, when the former is small, the latter is relatively large. This attenuates the accuracy of the road map data. Such an inconvenience can be avoided by making the adjacent nodes nearer to each other so that the link length L can be shortened. However, this excessively increases the number of the nodes, thereby boosting the cost for forming the road map data.

Figure 7A:
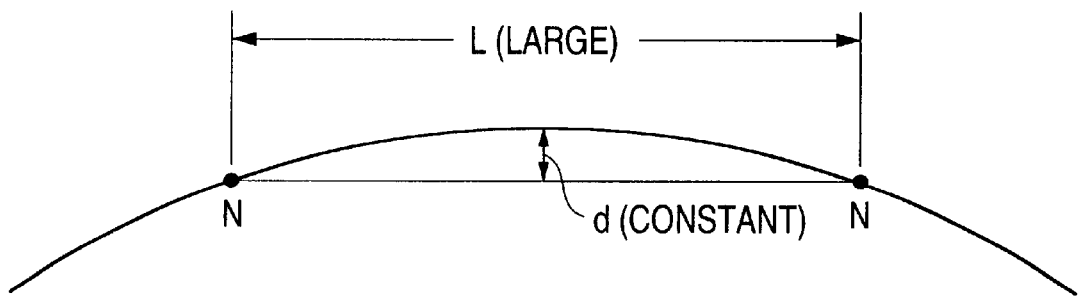
FIGS. 7A and 7B are views for explaining the relationship between the sag d and link length L.
Figure 7B:
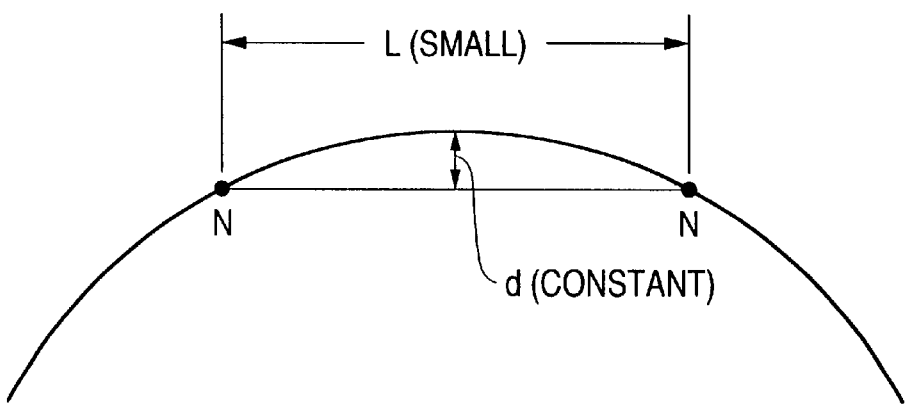

Therefore, when the road map data are formed, the positions of the nodes are determined so that the sag d between the link connecting the adjacent nodes N and N and the actual road does not exceed a prescribed upper limit. As a result, as seen from FIG. 7A, when the curvature of the road is large, in order that the distance between the link and the road does not exceed the prescribed upper limit of the sag d, the link length L is relatively long. Inversely, as seen from FIG. 7B, when the curvature of the road is small, in order that the distance between the link and the road does not exceed the prescribed upper limit of the sag d, the link length L is relatively short. In this way, by setting the positions of the nodes N . . . while the sag d is kept at the value not larger than the upper limit (generally, 2.5 m–6 m), the required accuracy of the road map data can be assured and the excessive increase of the number of the nodes can be avoided.

The maximum link length $L_{max}$ (link length L when the sag d is the upper limit of 2.5 m–6 m) can be expressed using the upper limit of the sag d and crossing angle of θ by Equation (1)
[Equation 1]

$$L_{max} = \frac{2d}{\tan\theta/4} \quad (1)$$

As seen from FIG. 5,
[Equation 2]

$$\frac{L_{max}}{2} = R\sin\theta/2 \quad (2)$$

is established. From Equation (2),
[Equation 3]

$$R = \frac{L_{max}}{2\sin\theta/2} \quad (3)$$

is introduced. Further, as seen from FIG. (5),
[Equation 4]

$$R-d = R\cos\theta/2 \quad (4)$$

is established. From Equation (4),

[Equation 5]

$$R = \frac{d}{1-\cos\theta/2} \quad (5)$$

is introduced. Canceling R in Equations (3) and (5), $L_{max}$ is expressed by
[Equation 6]

$$L_{max} = 2d\frac{\sin\theta/2}{1-\cos\theta/2} \quad (6)$$

Now, sin θ/2 is given by
[Equation 7]

$$\sin\theta/2 = \sin(\theta/4 + \theta/4) \quad (7)$$
$$= \sin\theta/4\cos\theta/4 + \cos\theta/4\sin\theta/4$$
$$= 2\sin\theta/4\cos\theta/4$$

And, cos θ/2 is given by
[Equation 8]

$$\cos\theta/2 = \cos(\theta/4 + \theta/4) \quad (8)$$
$$= \cos\theta/4\cos\theta/4 - \sin\theta/4\sin\theta/4$$
$$= \cos^2\theta/4 - \sin^2\theta/4$$
$$= 1 - \sin^2\theta/4 - \sin^2\theta/4$$
$$= 1 - 2\sin^2\theta/4$$

Transforming Equation (6) using Equations (7) and (8), $L_{max}$ is expressed by
[Equation 9]

$$L_{max} = 2d\frac{\sin\theta/2}{1-\cos\theta/2} \quad (9)$$
$$= 2d\frac{2\sin\theta/4\cos\theta/4}{1-(1-2\sin^2\theta/4)}$$
$$= 2d\frac{\cos\theta/4}{\sin\theta/4}$$
$$= \frac{2d}{\tan\theta/4}$$

Thus, the above Equation (1) is introduced.

The maximum link length in the above Equation (1), $L_{max}=2d/\tan\theta/4$ is the maximum value of the link length L when the nodes $N_{N-1}$, N, $N_{N+1}$, are present on the same curve. This is because the sag d on the right side in Equation (1) is the upper limit of the distance between the link and the road, and if the distance is smaller than the upper limit of the sag d, the link length L is smaller than the maximum link length $L_{max}$ in Equation (1). Therefore, where the link length L exceeds the value in Equation (1), i.e. L>2d/tan θ/4 is established, the nodes $N_{N-1}$, N, $N_{N+1}$ are not present on the same curve.

From the above, the reference link length $L_{refN}$ which is a standard for deciding whether or not the position of the node $N_{N+1}$ adjacent forward of the reference node $N_N$ is suitable is defined by

[Equation 10]

$$L_{ref} = AL_{max} = A\frac{2d}{\tan\theta/4} \quad (10)$$

$$0.2 < A < 0.5$$

Namely, the reference link length $L_{refN}$ is set as a value which is 0.2 times–0.5 times as large as the maximum link length $L_{max}$. If the actual link length $L_N$ between the nodes $N_N$ and $N_{N+1}$ is not larger than the reference link length $L_{refN}$, it is decided that the position of the node $N_{N+1}$ adjacent forward of the reference node $N_N$ is unsuitable. Incidentally, $0.2<A<0.5$ that is the value of coefficient A is determined experimentally.

Figure 8:
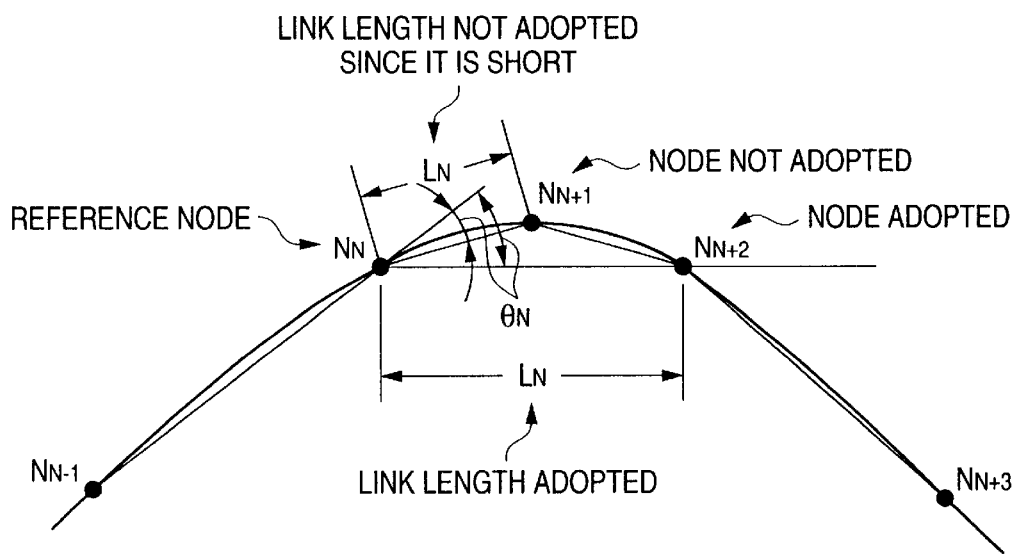
FIG. 8 is a view for explaining an unsuitable link length and a suitable link length.

Thus, in step S6, if the link length $L_N$ at the reference node $N_N$ is not larger than the reference link length $L_{refN}$, as seen from FIG. 8, in step S7, the node $N_{N+1}$ forward of the reference node $N_N$ is not adopted. After the node $N_{N+2}$ further forward is newly selected, the processing in steps S4–S6 is repeated on the basis of three node $N_{N-1}$, $N_N$ and $N_{N+2}$. As a result, in step S6, if the link length $L_N$ exceeds the reference link length $L_{refN}$, and is shorter than the maximum link length $L_{maxN}$, in step S8, the passing state decision quantity $\theta_N/L_N$ is computed by dividing the crossing angle $\theta_N$ by the link length $L_N$. Under the limitation by the above maximum link length $L_{maxN}$, adoption of the node $N_{N+2}$ which exceeds the maximum link length $L_{maxN}$, i.e. node $N_{N+2}$ not present on the same curve can be avoided.

Incidentally, the passing state decision quantity may not be computed as $\theta_N/L_N$, but may be computed as $\theta_N/(L_{N-1}/2+L_N/2)$ using the link lengths $L_{N-1}$ and $L_N$ before and behind the node $N_N$.

Figure 9:
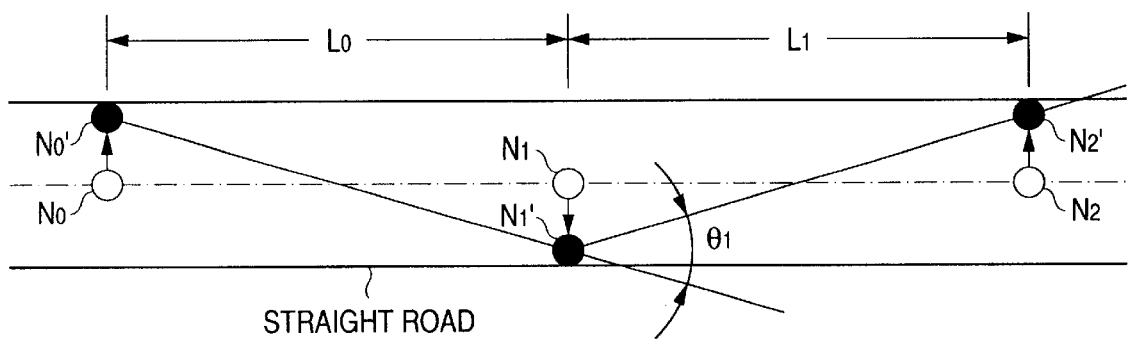
FIG. 9 is a view for explaining that an error of the node N affects the prediction of a road shape.

As described previously in connection with FIG. 9, the inconvenience that the data error at the reference node $N_N$, which is attributable to the link length $L_N$ being short, adversely affects the prediction of the road shape can be avoided by excluding the short link length $L_N$ by comparison between the link length $L_N$ and reference link length $L_{refN}$. In addition, since the maximum link length $L_{maxN}$ between the node N and $N_{N+1}$ is used as a standard for determining the reference link length $L_{refN}$, it is possible to avoid setting the reference link length $L_{refN}$ at an excessively large value with anxiety about an increase in the error in the road shape. It is possible to prevent the inconvenience that the node $N_{N+1}$ forward of the reference node $N_N$ cannot be selected, and surely select the forward node $N_{N+1}$.

Meanwhile, the yaw rate YR of a vehicle at the node $N_N$ is given by $\theta_N/t$ which results from dividing the crossing angle $\theta_N$, which is a changing quantity in the travelling direction of a vehicle, by a time t lapsed to produce it. Further, the time t is given by $L_N/V$ which results from dividing the link length $L_N$ by the vehicle speed V passing it. Therefore, the yaw rate YR is eventually computed from the product of the passing state decision quantity $\theta_N/L_N$ and the vehicle speed V by Equation (11)

[Equation 11]

$$YR = \frac{\theta_N}{t} = \frac{\theta_N}{L_N/V} = (\theta_N/L_N)V \quad (11)$$

On the other hand, the horizontal acceleration G of a vehicle is given by the product of the yaw rate YR and vehicle speed V.

[Equation 12]

$$G = (YR)V \quad (12)$$

Thus, in step S9, from Equations (11) and (12),

[Equation 13]

$$V_{maxN} = \{G/(\theta_N/L_N)\}^{1/2} \quad (13)$$

It is seen from Equation (13) that if the setting boundary horizontal acceleration G permitted when the vehicle passes the curve is defined, the passable speed $V_{maxN}$ when the vehicle passes the curve can be acquired by the setting boundary horizontal acceleration G and the passing state decision quantity $\theta_N/L_N$. The above passable speed $V_{maxN}$ is the highest vehicle speed at which the vehicle can pass while horizontal acceleration of the vehicle does not exceed the setting boundary horizontal acceleration G.

On the other hand, in step SA10, assuming that the vehicle has reduced the speed at the reference deceleration β from the own vehicle position P and the distance from the own vehicle position P to the node $N_N$ is $S_N$, the passage predicting speed $V_N$ at the node $N_N$ can be computed by

[Equation 14]

$$V_N = (V^2 - 2\beta S_N)^{1/2} \quad (14)$$

In step S11, the passage predicting speed $V_N$ is compared with the passable speed $V_{maxN}$. If $V_N \leq V_{maxN}$, it is decided that the vehicle can pass the node $N_N$. If $V_N > V_{maxN}$, it is decided that the vehicle is difficult to pass the node $N_N$. In this case, in step S12, in order that the driver is urged to reduce the vehicle speed, the warning device M9 is operated, and also in order to reduce the vehicle speed automatically, the vehicle speed adjusting device 10 is operated. Thus, the spontaneous braking by the driver and automatic speed reduction are done to reduce the vehicle speed so that the vehicle can surely pass the curve.

Although the embodiment of the present invention has been described hitherto, the present invention can be modified in several designs without departing from the spirit of the present invention.

For example, in the embodiment, although the passable speed $V_{maxN}$ has been computed on the basis of the setting boundary horizontal acceleration G, it can be computed on basis of the setting boundary yaw rate YR in place of the setting boundary horizontal acceleration G. Namely, using Equation (11), the passable speed $V_{maxN}$ can be computed by

[Equation 15]

$$V_{maxN} = \frac{YR}{\theta_N/L_N} \quad (15)$$

As understood from the description hitherto made, where the link length between the second and the third position is not larger than the reference link length set in accordance with the crossing angle of two links, the position of the node further forward is adopted in place of the third position to predict the road shape. Therefore, the link length necessarily exceeds the reference link length so that the predicting error in the road shape can be minimized.

In addition, in order to determine a standard for determining a reference link length, $2d/\tan(\theta/4)$ that is the maximum value of the link length between the second and third positions is multiplied by a coefficient A that is larger than 0 and smaller than 1. Therefore, it is possible to avoid setting the reference link length at an excessively large value with anxiety about an increase in the error in the road shape. This prevents the inconvenience that the third position is excluded excessively.

Moreover, where the position of the node further forward is located forward to exceed a prescribed length from the second position, the position of the node further forward is not adopted. For this reason, it is possible to avoid adopting the node not presenting on the same curve, to thereby prevent reduction in the predicting accuracy of the road shape.

Further, an error in a roadmap data is excluded to predict the road shape precisely and the running state is controlled so that the vehicle can pass the road having the predicted shape. For this reason, the vehicle can be suitably controlled according to the road shape so that the vehicle can surely pass a forward road.

The present disclosure relates to the subject matter contained in Japanese patent application No. Hei. 10-196258 filed on Jul. 10, 1998 which is expressly incorporated herein by reference in its entirety.

What is claimed is:

1. A road shape predicting method, comprising the steps of:

selecting three positions of positions of a plurality of nodes constituting road map data and an own vehicle position on a road; and predicting the road shape on the basis of a crossing angle formed by a link connecting a first position and a second position of the selected three positions and another link connecting the second and a third position thereof, and a link length between the second and the third positions, wherein, in case that the link length between the second and the third positions is not larger than a reference link length set in accordance with the crossing angle, the third position is excluded, and the position of a node further forward is adopted in place of the third position, to thereby predict the road shape.

2. A road shape predicting method according to claim 1, wherein said link length $L_{ref}$ is given by $$L_{ref}=A\{2d/\tan(\theta/4)\}$$

where

A: a coefficient satisfying 0<A<1 d: an upper limit of a sag

θ: a crossing angle formed by two links.

3. A road shape predicting method according to claim 1, wherein when the link length between the position of the node further forward and the second position exceeds a prescribed length, the adoption of the position of the node further forward is avoided.

4. A road shape predicting method according to claim 3, wherein said prescribed length $L_{max}$ is given by $$L_{max}=2d/\tan(\theta/4)$$

where d: an upper limit of a sag

θ: a crossing angle formed by two links.

5. A road shape predicting method according to claim 1, wherein the positions of the plurality of nodes are decided so that a sag being a distance between the link connecting the adjacent nodes and the actual road is not more than a preset upper limit thereof.

6. A vehicle controlling method using a road shape predicting method defined in claim 1, wherein the running state of a vehicle is controlled on the basis of said predicted road shape so that the vehicle can pass a forward road.

* * * * *